March 23, 1948. M. JACOBS 2,438,339

LAMINATED SHEET AND COMPOSITION FOR COATING LAMINAE

Filed July 16, 1942

INVENTOR.
MAURICE JACOBS
BY
ATTORNEY

Patented Mar. 23, 1948

2,438,339

UNITED STATES PATENT OFFICE 2,438,339

LAMINATED SHEET AND COMPOSITION FOR COATING LAMINAE

Maurice Jacobs, Ridgefield, N. J., assignor, by mesne assignments, to Albert W. Clurman, New York, N. Y., as trustee Application July 16, 1942, Serial No. 451,240

19 Claims. (Cl. 154—45.9)

This invention relates to manufacture of fire proof coating compositions and structural elements made therefrom; and it comprises a coating composition containing a sodium silicate of 40° to 47° Bé., and ground mica, with China-Wood oil, and mineral oil.

The coating composition has a consistency varying from that of a paint to that of a soft mortar. It may be utilized in different manners; as a film, as a coating of materials, as a binder in a lamination, and as a binder in an interleaving of fibres, etc.

The invention includes the combining of silicate of soda and ground mica which when subjected to heat causes a fusing or fluxing of the film applied to a base when tung oil is added to the foregoing certain characteristics are improved and if in place of tung oil, mineral oil is used, other features are emphasized.

The invention also includes a method of making said coating composition which involves the steps of emulsifying the sodium silicate with tung oil and the mineral oil heated, followed by mixing in said filler of mica and the other ingredient, titanium dioxide.

In addition the invention includes structural building elements suitable for making partition constructions and the like which are produced from said coating composition by applying the same to a fibrous sheet, such as paper-board, for example, or by mixing the same with a fibrous material, such as asbestos or excelsior or cellulose fibers, or forming the mass into sheets by coating paper-board with the described composition, or having a multiplicity of layers of the composition and paper in laminated form.

One object of this invention is to produce a coating composition adapted to be applied as a film or as a stucco, plaster or the like, having the characteristic property of being fire resistant, and in certain cases producing an insulation over the underlying combustible surface to which the composition may be applied, by reason of its ability to expand outwardly toward the flame in the form of blisters, and thus protecting the underlying surface of the combustible material beneath said blisters.

The invention consists further in combining this basic composition with certain ingredients, so that the composition encloses cells of spumous character which combination acts even less thermally than the composition itself, has great insulating value, and does not retain heat.

The invention accordingly consists in the novel compositions, methods of compounding, features of construction and structural elements which will be exemplified in the specific examples and description hereinafter set forth.

Referring to the drawings.

In the four figures like elements are indicated by like reference numerals.

Figure 1:
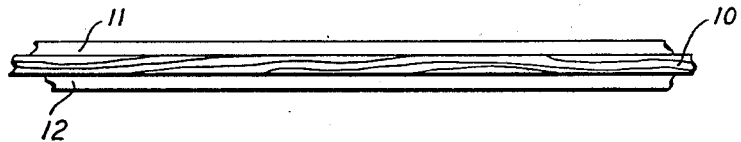
Fig. 1 is a cross section, on an enlarged scale through a known composition board which has been fire proofed by a coating in the form of a film.

Referring to Fig. 1, the base is shown at 10 and the coating on both sides is represented by 11 and 12. The building board shown, having a coating with a thickness of about $\frac{1}{32}$ inch at each side thereof, has many of the structural properties of the usual gypsum board or sheet rock but has the important advantage of being entirely fire proof. The board can be sawed, chiseled, nailed, cut and worked much like wood. It has the advantage that it can be bent into any desired form before the coating has completely hardened. The coating has but little tendency to slip, even upon hammering, and has but little tendency to break. If desired, the coating may be applied on only one side of the board.

Figure 2:
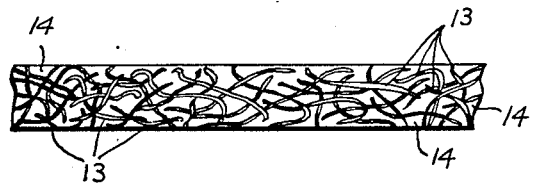
Fig. 2 is a similar cross section, on an enlarged scale through a fibrous building element of a different type.

The board of Fig. 2 is made from excelsior, shown at 13, the excelsior fibers being uniformly coated with the compositions described. The coating is shown at 14. The uniform coating of the excelsior fibers results from the method by which this board is made. In this process a mass of excelsior is thoroughly mixed with a batch of coating composition until all fibers are thoroughly coated. The mass may be force-dried by low temperature heat after mixing, if desired, and while being molded in a press or otherwise formed into the desired shape and thickness. The pressure applied may be varied widely in accordance with the type of product desired. A hard dense board may be produced by using high pressure or a more porous and lighter board can be made by the use of only sufficient pressure and controlled temperature to produce the desired form of thickness and porosity. In either case the fibers are held tightly together by the coating composition which acts as an excellent binder. Wood flour can be used in place of or in combination with excelsior, which results in a more compact board. The boards made in this manner can be nailed, sawed, bent and otherwise worked.

Figure 3:
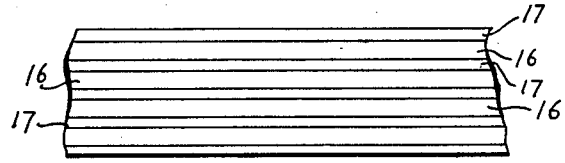
Fig. 3 is a section of a laminated board in which paper and the composition coating alternate.

In Fig. 3, laminations of kraft paper 17 and composition 16 are shown tightly pressed together by high pressure.

Figure 4:
Fig. 4 shows the blistering effect when intense localized heat is applied.

In Fig. 4 is shown a block of wall board 20 with a layer 19 of composition coating thereon, and the formation of blisters 21 and 22 by the application of intense heat to the composition coating.

While I have described a sodium silicate of 40° to 47° Bé. as the preferred and most desirable to be used to enable all the desired characteristics to be obtained, as described, sodium silicates of other Beaumé may be used instead of or in combination with that of 40° to 47° Bé. and good results obtained.

In carrying out the invention as applied to a coating material, a vehicle containing silicate of soda of 40° to 47° Bé., tung oil, such as China-wood oil, and a plasticizer, such as mineral oil is mixed with a filler, such as ground mica, and titanium dioxide, care being taken to provide a desired fluid consistency.

In carrying out the invention as applicable to a plastic composition, a solution of silicate of soda of determined density of 40° to 47° Bé. is mixed with tung oil, such as China-wood oil and a plasticizer, such as a mineral oil. The tung oil and mineral oil are heated to a relatively high temperature, and thoroughly mixed with the sodium silicate to form an emulsion. To this emulsion a filler in the form of ground mica and titanium dioxide are added and thoroughly incorporated. After the mixing and incorporating of the ingredients are completed, the resultant product is ready for application to structural or other walls or to surfaces made of wood or other combustible or incombustible materials, or onto any suitable lath or any other material, to which fire-proofing compositions are desirable or are required by law or usage.

The following specific examples represent preferred coating compositions within the present invention, which have been found highly satisfactory in actual practice and with which the building elements of the invention may be constructed.

2¾ gallons or 22 pounds of China-wood oil were mixed with 1⅜ gallons of white mineral oil, having a viscosity of 85 to 180 seconds Saybolt. This mixture was heated with stirring to a temperature of about 400° F. to produce a substantially homogenous mixture. This mixture was then added to a tank containing 44 gallons of silicate of soda having a gravity of 40° to 47° Bé. The tank was agitated with a stirrer revolving at about 35 R. P. M. and while agitating there were added 135 pounds of ground mica having a fineness corresponding to a screen ranging from about 100 to 250 mesh per inch. Agitation was continued, cooling taking place to room temperature for about an hour until an emulsion was produced, then 3 pounds of titanium dioxide were mixed in, the final consistency corresponding to that of a heavy paste.

After the applied coating is dry to the touch which takes about thirty minutes, it becomes hard and tough in about 24 hours at which time it attains its essential set. The coating as a whole is harder than an ordinary plaster of equal thickness. This mix was applied as a coating having a film thickness of about $\frac{1}{32}$ inch to a building composition board which film was fire proof and protected the building composition board from flame applied to the film.

When a blow torch, for example, is directed against a film or coating of the composition described, a series of stratified blisters, one over the other, are formed at the heated spot, these blisters swelling outwardly and thus protecting the underlying surface of the material to which the coating has been applied. The blisters form in series one beneath the other. The explanation of this phenomenon apparently lies in the fact that certain materials in the coating, when highly heated, distill gases beneath the outer relatively harder layer, and the latter, upon being so heated, becomes soft and elastic to enable it to stretch without tearing or breaking, yielding to the pressure of the distilled gases to form the blister. The emulsified colloidal composition may aid to form gases which aid the expansion effect. The heat reaching the coating layer beneath the strata of expanded film enclosing the gases acts upon it in the same manner as in the first instance and causes another strata of the film-mass to be formed in the manner and direction of the first expanded film, thus a new bubble is formed though not of the same dimensions, etc. The blisters formed in this manner are, of course, very poor conductors of heat. In the film of the coating composition the telescopic or stratified arrangement of the blisters derives from the following facts:

A. The coating composition being top-drying, a cross-section of the applied film would disclose the mass of the coating in different degrees of hardness from top to bottom of the film. This is believed to result in differing points of what may be termed delamination on application of elevated temperatures.

B. Collaterally, to build up the coating composition to any thickness of film above approximately $\frac{1}{128}$ of an inch it is preferable to do it by a series of successive coats, allowing the first to dry before the next is applied, in order to avoid "curtaining" or "running" of the film. The resulting differential in hardness of each coat seems to persist indefinitely and appears to aid and facilitate the stratified formation of the blisters which form as described.

The surface underlying the blistered film is thus protected from the heat of the flame. The blister serves to oppose and to retard conduction of destructive temperature to the underlying surface and to oppose and retard ignition. After the blisters formed in this manner become cool which occurs almost immediately after removing the flame, they have the appearance of a thin metallic sheet but they are brittle having vitreous properties and can be shattered if sufficient force is applied. The vitreous nature of these films is due undoubtedly to the proportion of sodium silicate in the composition. The part of the coating below the undermost blisters formed does not upon the application of such heat expand away from the underlying base to which it has been applied but on the contrary becomes fused thereto, thus further preventing ignition by exclusion of air necessary to support ignition.

If it is desired to produce a coating of the consistency of a paint, the composition can be thinned with water. The resultant paint will dry to a hard finish within a period of about 24 hours and, if several coats are applied, this will render the base to which they are applied fire proof against the flame applied to the coating.

In the process of making the composition, it is essential and necessary to prevent any of the ingredients from separating out since it is highly desirable to obtain a smooth and uniformly mixed product which will properly and quickly set after application.

All of the above noted components are divided into two general groups, namely;

1. Silicate of soda, consisting preferably of the compound $Na_2SiO_3$ and $Na_2SiO_3 9H_2O$ and in solutions or concentrations ranging from 40° to 47° Bé.

2. China-wood or tung oil and mineral oil previously mixed and incorporated at about 400° F.

The ingredient of group 1 is taken first and to it is added the mixture listed above under group 2. There is a constant and thorough stirring of these two groups until an emulsion is formed. It is believed that the tung oil and mineral oil mixture surrounds to a large extent atoms of the silicate soda and holds it captured, the surface tension of the oils enabling this to be done. The ground mica is then added to this emulsion under constant stirring in the order indicated above, until these later added materials become thoroughly dispersed therewith. Titanium dioxide is then added. This is a whitening agent and has contributing qualities. It is to be noted that, during the addition of each of these ingredients of the last group, there must be constant and additional stirring.

For the best results it is essential to use silicate of soda of 40° to 47° Bé. Sodium silicate is colloidal, and is available in solution. The chemical and physical characteristics of the various silicates are widely different and they produce different effects.

Silicate glass, dissolved in water varies according to the ratio of sodium oxide to silica. Solubility may be decreased by a relatively small amount of impurities. Different grades are produced by changing the proportions of ingredients, by regulating the concentration of the solution and by special processes which impart specific properties. The boiling point is a little higher than water. For these reasons emphasis is placed on a silicate of soda of 40° to 47° Bé.

The China-wood or tung oil in the composition helps to form a dry, hardened surface, while the mineral oil is non-evaporative and helps to keep the composition when made and during storage in sealed containers or before application, sufficiently soft or plastic to permit easy application on to the base to be protected, and adds to the applied coating improved levelling qualities.

It is to be noted from a chemical viewpoint that the silicate, mica and titanium dioxide are inorganic, while the organic ingredients are tung oil, and mineral oil.

When the composition is made as described it is plastic and easy to apply, having about the same consistency of a soft mix of the ordinary plaster used in building work. The composition can be applied to the surface of a base to be protected or fire proofed by a compressed air spray gun, and the thickness of the coat may vary. It has been found that a coating of approximately $\frac{1}{32}$ inch has given satisfactory results. Once the composition has been applied, the coating firmly adheres to the base. Also, the composition after application to the base and after exposure to the air for a time, for example, after one or two hours, has its exterior surface gradually oxidized and begins to form a tough, hard layer, while the material within this layer remains somewhat plastic, at least softer than the exterior layer. While there is a setting of the composition, it is to be understood however, that it does not become as hard as ordinary plaster, but is, in fact somewhat coriaceous. After some time it becomes harder than plaster.

From the foregoing it will be noted that my composition includes a fire-retarder or resistant, a dryer, a plasticizer and a filler for forming the bulk of the composition.

Among the many advantages of my composition is that it can be readily and easily applied on any surface for which intended, such as wooden walls, mesh screen, plaster board, composition wall board, plywood or wooden panels, sheet metal, steel structural members, or other means of keeping it supported to the surface to which applied. It can readily be used for fireproofing ordinary wood. Also, the composition when applied and set is an efficient fire resistant and heat insulator. Conversely, the novel composition does not conduct heat to induce combustion or aid the combustible material to reach its kindling temperature. It is non-combustible and cheap to manufacture. Its application is simple and easy, by the use of a compressed air gun. Variation of temperature will not crack the composition.

The foregoing invention may be combined with spumous granules. Having obtained the composition resulting from the sodium silicate, the tung oil, and the mineral oil with ground or finely divided mica, and titanium dioxide, a quantity of denatured alcohol is added. A derivative of alcohol may be used, or an acid like phenol or carbolic acid, whereby a coagulation results. This coagulated mass, the fluid having evaporated or been drawn off, is cut by a suitable screen into small squares, and these coagulated squares are whirled around, in a centrifugal, whereby the corners are rounded. These granules are then subjected to heat and become dry and expand substantially swelling up somewhat in resemblance to the action of heat on popcorn. These granules are then mixed with a composition consisting of sodium silicate, tung oil and mineral oil prepared as in a manner described, without mica and titanium dioxide, and when this composition which now acts as a binder, dries, it, the binder, acts as carrier for these spumous granules; or, prior to the binder drying, this mix can be used as a cement or mortar, and applied to steam pipes, boilers, etc., by a trowel. It has a great insulating value, and has a low thermal capacity.

While I have described what I consider to be the most advantageous applications of my invention, it is obvious that many changes can be made in the specific procedures and structures which have been described without departing from the purview of this invention. Thus, the various ingredients of the specific compositions which have been described can be replaced by certain other materials which have the same or similar properties. If tung oil cannot be obtained, then dehydrated castor oil may be used in place thereof. A linseed oil product known as Kellin may be used. These products, dehydrated castor oil and Kellin linseed oil are of the type which have been put upon the market to be used in place of tung oil. The mineral oil, which serves as a softener or plasticizer, can be replaced by any other non-volatile (high-boiling) liquid having plasticising properties, acting in substantially the same way as mineral oil acts in the presence of tung oil and sodium silicate.

The filler used in my compositions can be either organic or inorganic. Among the organic fillers I prefer cellulose fibre, although any other finely divided material of like nature can be employed. Among the inorganic fillers I prefer ground or other finely divided mica. Commercial muscovite is satisfactory but the so-called amber mica has a higher fire resistance. Asbestos fibres, asbestine, fuller's earth, chalk and other inert fillers can be used but none of these has the fire resistant and insulating properties of powdered mica. The use of mica is also important because of its lubricating properties when powdered or in desiccated form which make the compositions containing mica easy to apply and easy to work.

Any of the water sodium silicates of 40° to 47° Bé. such as the alkali metal silicates can be used as the fire resistant component. The coating compositions can be colored by incorporating therein suitable pigments and coloring agents in place of titanium dioxide. The pigments serve as bodying agents or fillers and impart fire resistant properties to the compositions.

Tests made with silicate of soda and ground mica with 135 lbs. to 44 gallons of silicate of soda, have shown when flame was applied initial blistering effects. Tests made with silicate of soda and ground mica in the proportion given, with tung oil in the proportion of 4⅛ gallons to the 44 gallons of silicate, the product when subjected to flame was commercially improved. Tests made with silicate of soda, ground mica, and mineral oil, the latter in the proportion of 4⅛ gallons to the 44 gallons of silicate gives results of a certain character but not quite the same as when tung oil is used. Tests with silicate, mica and tung oil and mineral in the proportions stated give very good results and when titanium dioxide is added the best commercial results are obtained. In each case the oils were boiled to 400° F. Other modifications of this invention which fall within the scope of the following claims will be immediately evident to those skilled in this art.

An interesting test was made with a base covered by a coating of the improved composition formed of silicate of soda of 40° to 47° Bé., tung oil, and mineral oil, with ground mica and titanium dioxide added, wherein when the coating was subjected to intense heat gradually elevated to 1700° F., or more, for a period of three hours, during which time blisters formed at the early application of the elevated temperature, which blisters acted as a substantial baffle against substantial conduction of destructive heat to the underlying base, said blisters and the underlying coating remaining so effective that the base was not substantially effected.

The composition described may be also used in connection with sound absorbing tiles, either in the nature of a ceramic tile, the embodiment of Fig. 2, being an example of such use. Or, the embodiment such as that of Fig. 2 may be provided with a layer of rigid composition and provided with perforations spaced apart, depending on the sound frequencies desired to be absorbed, the structure such as that of Fig. 2 then acting as an absorbent. The perforations in said rigid layer make it transparent to sound.

Also, an embodiment such as Fig. 2 may be provided with such a rigid layer, with or without perforations, and the outer surface provided with a light reflecting surface to give proper illumination.

Or, a composition board made solely of the improved composition can be used with acoustical correction that is with perforations, and placed over, to hide a layer of sound absorbing felt and to this board on one side thereof, the illumination surface coating can be applied, and also, any decoration desired. While the felt in this case is combustible the adjacent composition coating layer or board, fully protects the felt, the perforations being too small to permit ignition. Instead of felt some other fibrous material can be used, covered by a sheet of my improved composition provided with perforations.

TABLE 1

*Vertical flame spread tests*

| Test Specimen Number | Test Specimen Description | Time of Flaming (Min. Sec.) | Charred Area |
|---|---|---|---|
| 1 | Oak, coated | 0:00 | 1″ x ⅛″ |
| 2 | Pine, coated | 0:00 | ¼″ x ⅜″ |
| 3 | Pine, uncoated | 5:00 | Entire panel charred. |
| 4 | Oak, uncoated | 6:30 | Do. |

TABLE 2

*Flame penetration tests*

| Test Specimen Number | Test Specimen Description | Time for Flames from Exposed Surface (Min. Sec.) | Time for Scorching on Reverse Surface (Min. Sec.) | Time for Light to Show through Cracks (Min. Sec.) | Time for Flame Penetration (Min. Sec.) | Time of Burner Removal (Min. Sec.) |
|---|---|---|---|---|---|---|
| 1 | Plywood, Coated | 1:10 | 14:00 | 32:00 | 38:00, Flame did not penetrate | 60:00. |
| 2 | do | 1:30 | 14:00 | 22:00 | 22:00 | 22:50. |
| 4 | Plywood Uncoated | 0:10 | 8:00 | 12:40 | 13:00 | 13:00. |
| 5 | Plywood, Coated | No flames | No scorching | No cracking | No penetration | 22:00. |

In this trial, a small flame, with reduced air (no distinct inner cone) was applied with continuous motion for two minutes. This flame was then replaced by the standard flame.

TABLE 3
Furnace tests—plywood and Celotex panels

| Test Specimen Number | Test Specimen Description | Time for Flaming from Exposed Surface (Min. Sec.) | Time for Scorching or Smoking on Reverse Surface (Min. Sec.) | Time for Flaming on Ridges of Reverse Surface (Min. Sec.) | Time for Extensive Flaming on Reverse Surface (Min. Sec.) | Time of Removal from Furnace (Min. Sec.) |
|---|---|---|---|---|---|---|
| 1 | Plywood, Coated | 7:00 | 8:00 | 8:00 | 11:30 | 11:30 |
| 2 | Plywood, Uncoated | 0:00 | | 5:00 | 6:30 | 6:30 |
| 3 | Plywood, Coated | 4:00 | 9:00 | 11:00 | 12:00 | 12:00 |
| 5 | Celotex, Uncoated | 0:00 | | | 0:40 | 2:00 |
| 6 | Celotex, Coated | | 0:30 | 5:45 | 6:05 | 7:15 |
| 7 | do | 1 5:00 | 0:55 | 2:30 | Removed prior to extensive flaming. | 5:00 |
| 8 | do | 3:20 | 6:30 | 6:40 | 6:50 | 6:50 |
| 9 | Plywood, Coated | 4:45 | 11:00 | Removed at first evidence of scorching. | | 11:00 |
| 12 | Plywood, Coated ¼" | 19:30 | 23:30 | 23:00 | 26:00 | 26:00 |
| 13 | Plywood, Coated 2 | 84:00 | 108:00 | Panel did not flame but was completely charred. | | 180:00 |
| 14 | Plywood, both sides coated. | 6:00 | | No scorching or flaming | | 180:00 |

1 Flaming from exposed surface was not definitely established in this case until panel was removed from furnace.
2 This test started with furnace temperature 280° F.; the temperature was increased gradually reaching approximately 1700° F.

TABLE 4
Furnace test—steel panels

| Test Specimen Number | Test Specimen Description | Time for Warping (Min. Sec.) | Time for Reverse Surface to Become Red Hot (Min. Sec.) | Maximum Recorded Temperature on Reverse Surfaces 1 |
|---|---|---|---|---|
| 4 | Steel Coated | No Marked warping. | 40:00 | 740° at 48:00 min. |
| 10 | do | 61:00 | 61:00 | 480° at 54:00 min. |
| 11 | Steel Uncoated | 2:00 | 3:00 | 1640° at 4:00 min. |

1 This temperature is not necessarily the maximum temperature attained on the reverse face of the panel, since the temperature was non-uniform over the surface of the panel.

TABLE 5
Acetylene flame tests

| Test Specimen Number | Test Specimen Description | Time for Flames from Exposed Surface (Min. Sec.) | Time for Flame Penetration (Min. Sec.) |
|---|---|---|---|
| 1 | Plywood, Coated | 10:00 | Flame had not penetrated 15 min. |
| 2 | Plywood, Uncoated | 0:20 | 8:00. |

TABLE 6
Oxyacetylene torch cutting tests on steel

| Test Specimen | Test Description | Time required to Cut Strip (Min. Sec.) | Notes |
|---|---|---|---|
| 1 | Steel ¼" x 2" x 36" Uncoated. | 2:20 | |
| 2 | Steel ¼" x 2" x 36" Coated on one side. | 12:20 | Approximately 2 miuntes additional time required due to clogging of torch. |
| 3 | Steel ¼" x 2" x 36" Strips (2) bolted together, with coating between. | 16:05 | Not completely burned through at 9 points. |
| 4 | Steel ¼" x 2" x 36" Strips (2) bolted together—uncoated. | 1:15 | |

What is claimed is:

1. A coating composition having fire proofing properties comprising the reaction products of a solution of a sodium silicate of 40° to 47° Bé. emulsified with a drying oil and a mineral oil and containing a finely divided filler to impart body to said composition in the proportions of 44 gallons of sodium silicate, 2¾ gallons of drying oil and 1⅜ gallons of mineral oil.

2. The composition of claim 1 wherein said drying oil is selected from a class consisting of tung oil, dehydrated castor oil and linseed oil.

3. The composition of claim 1 wherein said filler is ground mica.

4. The composition of claim 1 wherein said filler has the inert inorganic attributes of mica.

5. A coating composition having fire proofing properties comprising the reaction products of a solution of a sodium silicate of 40° to 47° Bé., emulsified with a drying oil and a high-boiling mineral oil and mixed with a finely divided mica filler and titanium dioxide in the proportions of 44 gallons of sodium silicate, 2¾ gallons of drying oil, and 1⅜ gallons of mineral oil.

6. A substantially fire-proof building element comprising a fibrous base coated with the reaction products of a composition comprising a sodium silicate of 40° to 47° Bé., a drying oil, a mineral oil and a filler, said coating having the characteristic property of expanding outwardly in the form of blisters when subjected to an elevated temperature, the material present in said composition being capable of supplying sufficient gases to produce said expansion of a film of such composition by gases the proportions being 44 gallons of sodium silicate, 2¾ gallons of drying oil, 1⅜ gallons of mineral oil, and 135 pounds of mica.

7. The process of making a fire proofing coating composition which comprises emulsifying a solution of sodium silicate of 40° to 47° Bé., with a high boiling mineral oil and a drying oil, and mixing in inert fillers such as ground mica, and titanium dioxide in the proportions of sodium silicate 44 gallons, mineral oil 1⅜ gallons, and drying oil 2¾ gallons.

8. The process of making a substantially fire proof building element which comprises thoroughly mixing a loose fibrous material with a composition comprising an emulsion of a solution of a sodium silicate of 40° to 47° Bé., a high boiling mineral oil, a tung oil and a mica filler, with the addition of titanium dioxide, thereby thoroughly coating said fibrous material with said composition, and formed into the form of a building element in the proportions of sodium silicate 44 gallons, mineral oil 1⅜ gallons, and drying oil 2¾ gallons.

9. A building element consisting of alternate laminations of sheets of fibrous material and of a composition composed of emulsion of sodium silicate of 40° to 47° Bé., a high boiling mineral oil, a tung oil, a mica filler and titanium dioxide, formed by high pressure into the form of a building element in the proportions of sodium silicate 44 gallons, mineral oil 1⅜ gallons, and drying oil 2¾ gallons.

10. A building element consisting of a plurality of highly spumous granules of a composition consisting of the reaction products of emulsion of a sodium silicate of 40° to 47° Bé., a high boiling mineral oil, a tung oil, a mica filler and titanium dioxide, surrounded by the reaction products of a composition of sodium silicate, tung oil and mineral oil, formed into the form of a building element in the proportions of sodium silicate 44 gallons, mineral oil 1⅜ gallons, and drying oil 2¾ gallons.

11. The process of making a fire proof composition, which consists in dividing a mass of reaction products of a coagulated composition consisting of sodium silicate of 40° to 47° Bé., a tung oil, and a mineral oil, with ground mica and titanium dioxide, thoroughly emulsified, said coagulation resulting from adding to said emulsified composition, a quantity of denatured alcohol, into squares, then whirling the squares to round them, and then surrounding the rounded granules with the reaction products of a composition of sodium silicate of 40° to 47° Bé., tung oil and mineral oil, thoroughly emulsified in the proportions of 44 gallons of sodium silicate, 2¾ gallons of tung oil and 1⅜ gallons of mineral oil.

12. The process of making a fire proof composition which consists in thoroughly mixing at a temperature of about 400° F. 2¾ gallons of tung oil and 1⅜ gallons of mineral oil, then adding this mix to a solution of 44 gallons of sodium silicate of 40° to 47° Bé., then continuing said mixing until an emulsion is formed.

13. The process of making a fire proof composition which consists in thoroughly mixing at a temperature of about 400° F. 2¾ gallons of tung oil and 1⅜ gallons of mineral oil, then adding this mix to a solution of 44 gallons of sodium silicate of 40° to 47° Bé., then continuing said mixing until an emulsion is formed, then adding ground mica and titanium dioxide, under continual agitation and mixing.

14. The process of making a fire proof composition which consists in thoroughly mixing at a temperature of about 400° F. 2¾ gallons of tung oil and 1⅜ gallons of mineral oil, then adding this mix to a solution of 44 gallons of sodium silicate of 40° to 47° Bé., then continuing said mixing until an emulsion of pasty constituency is formed, then coagulating the same by the addition of alcohol and then cutting the coagulated mass into granules.

15. A fire proof composition comprising the reaction products of an emulsified vehicle of 44 gallons of sodium silicate of 40° to 47° Bé., 2¾ gallons of tung oil and 1⅜ gallons of a mineral oil, with 135 pounds of ground mica and 3 pounds of titanium dioxide, adapted to be applied to a base, and having the capacity of forming blisters on its surface when such surface is exposed to heat gradually elevated to 1700° F., or more, said blisters acting as a substantial baffle against substantial conduction of destructive heat to the underlying base, said blisters remaining effective for a period of time depending on the thickness of the composition formed into blisters and the thickness of the composition applied to the base.

16. The process of making a fireproof composition which consists in thoroughly mixing at a temperature of 400° F. tung oil and mineral oil, in the proportions of two and three-quarters gallons of tung oil and one and three-eighths gallons white mineral oil, the mineral oil having the viscosity of 85 to 180 seconds Saybolt; thoroughly stirring this mixture to produce a homogeneous mixture, emulsifying said mixture with forty-four gallons of silicate of soda of 40° to 47° Bé., stirring at 35 R. P. M., adding during stirring one hundred and thirty-five pounds of ground mica, having a fineness corresponding to a screen of 100 to 250 mesh per inch; agitating the compound until cooled, and adding three pounds of titanium dioxide, to produce the final consistency of substantially that of soft heavy paste.

17. The product resulting from the process of making a fire proof composition which consists in thoroughly mixing at a temperature of 400° tung oil and mineral oil, in the proportions of two and three-quarters gallons of tung oil and one and three-eighths gallons white mineral oil, the mineral oil having the viscosity of 85 to 180 seconds Saybolt; thoroughly stirring this mixture to produce a homogeneous mixture, emulsifying said mixture with forty-four gallons of silicate of soda of 40° to 47° Bé., stirring at 35 R. P. M., adding during stirring one hundred and thirty-five pounds of ground mica, having a firmness corresponding to a screen of 100 to 250 mesh per inch; agitating the compound until cooled, and adding three pounds of titanium dioxide, to produce the final consistency of substantially that of soft, heavy paste.

18. The process of making a fireproof composition which consists in thoroughly mixing at a temperature of about 400° mineral oil and a drying oil selected from a class consisting of tung oil, dehydrated castor oil and linseed oil, in the proportions of one and three-eighths gallons of mineral oil, and of two and three-quarters gallons of said drying oil, the mineral oil having a viscosity of about 85 to 180 seconds Saybolt; thoroughly stirring this mixture to produce a homogeneous mixture, emulsifying said mixture with forty-four gallons of silicate of soda, and adding one hundred and thirty-five pounds of ground mica having a fineness corresponding to a screen of about 250 mesh per inch.

19. The product resulting from the process of making a fireproof composition which consists in thoroughly mixing at a temperature of 400° mineral oil and a drying oil selected from the class consisting of tung oil, dehydrated castor oil and linseed oil, in the proportions of one and three-eighths gallons of mineral oil, and of two and three-quarters gallons of said drying oil, the mineral oil having the viscosity of about 85 to 180 seconds Saybolt; thoroughly stirring this mixture to produce a homogeneous mixture, emulsifying said mixture with forty-four gallons of silicate of soda, stirring the same, adding during stirring one hundred and thirty-five pounds of ground mica having a fineness corresponding to a screen of about 250 mesh per inch; agitating the compound until cooled, and adding three pounds of titanium dioxide, said compound having the final consistency of substantially that of soft heavy paste.

MAURICE JACOBS.

REFERENCES CITED

The following references are of record in the file of this patent:

UNITED STATES PATENTS

| Number | Name | Date |
| --- | --- | --- |
| 1,647,666 | Rogers | Nov. 1, 1927 |
| 2,084,486 | Flood et al. | June 22, 1937 |
| 2,216,251 | Quisling | Oct. 1, 1940 |

FOREIGN PATENTS

| Number | Country | Date |
| --- | --- | --- |
| 1,400 | Great Britain | 1904 |
| 2,645 | Great Britain | 1901 |
| 495,488 | Great Britain | 1938 |